(12) United States Patent
Ouyang

(10) Patent No.: US 7,854,331 B2
(45) Date of Patent: Dec. 21, 2010

(54) SELF STORING BICYCLE DISPLAY

(75) Inventor: Jeffrey C. Ouyang, Glenview, IL (US)

(73) Assignee: Cormark, Inc., Des Plaines, IL (US)

( * ) Notice: Subject to any disclaimer, the term of this patent is extended or adjusted under 35 U.S.C. 154(b) by 296 days.

(21) Appl. No.: 12/252,858

(22) Filed: Oct. 16, 2008

(65) Prior Publication Data

US 2009/0178984 A1 Jul. 16, 2009

Related U.S. Application Data

(60) Provisional application No. 61/021,213, filed on Jan. 15, 2008.

(51) Int. Cl.
*A47F 7/00* (2006.01)

(52) U.S. Cl. .................................................. 211/18

(58) Field of Classification Search ............ 211/17–24, 211/13.1, 87.01, 175; 224/924; 248/292.11, 248/180.1
See application file for complete search history.

(56) References Cited

U.S. PATENT DOCUMENTS

| | | | |
|---|---|---|---|
| 557,567 A | 4/1896 | Eddy | |
| 580,032 A | 4/1897 | Beirbach | |
| 610,656 A | 9/1898 | Martin | |
| 618,394 A * | 1/1899 | Clark | 211/18 |
| 618,999 A | 2/1899 | Sayer | |
| 621,819 A | 3/1899 | Ivatt | |
| 624,231 A | 5/1899 | Martin | |
| 633,806 A | 9/1899 | Cifka | |
| 869,973 A * | 11/1907 | Lehmkuhl | 248/292.11 |
| 1,232,501 A | 7/1917 | Colen | |
| 2,875,903 A | 3/1959 | Shourds | |
| 3,057,491 A * | 10/1962 | Schlensker | 414/557 |
| 3,417,874 A | 12/1968 | Bryant | |
| 3,782,559 A | 1/1974 | Wright | |
| 3,828,413 A | 8/1974 | Province et al. | |
| 3,872,972 A | 3/1975 | Cummins et al. | |
| 3,883,002 A | 5/1975 | Moore | |
| 3,924,751 A | 12/1975 | Ballenger | |
| 3,934,436 A | 1/1976 | Candlin et al. | |
| 3,963,227 A | 6/1976 | Molders | |

(Continued)

*Primary Examiner*—Darnell M Jayne
*Assistant Examiner*—Patrick Hawn
(74) *Attorney, Agent, or Firm*—Levenfeld Pearlstein, LLC

(57) ABSTRACT

A display for a bicycle includes a mount, a support arm pivotally mounted to the mount for movement between a storage position and an access position, the support arm having a hanger thereon for hanging the bicycle therefrom, and a cylinder assembly including a dampening cylinder operably connected to the mount and to the support arm to dampen movement of the support arm and to return the support arm to the storage position. The cylinder assembly includes a locking member configured to lock the cylinder in a retracted position to maintain the support arm in the access position and to release the cylinder to permit the support arm to return to the storage position. A clamp arm is mounted to the support arm for pivoting between a securing position to secure the bicycle on the hanger when the support arm is in the storage position and a release position to allow for removing the bicycle from the hanger when the support arm is in the access position. An actuating element is operably connected to the cylinder assembly and to the clamp arm to pivot the clamp arm between the securing position and the release position as the support arm is moved between the storage and access positions.

13 Claims, 8 Drawing Sheets

U.S. PATENT DOCUMENTS

| | | |
|---|---|---|
| 3,976,200 A | 8/1976 | Munns |
| 3,981,158 A | 9/1976 | Watson |
| 4,091,488 A | 5/1978 | Artzberger |
| 4,114,764 A | 9/1978 | Rich |
| 4,116,341 A | 9/1978 | Hebda |
| 4,156,523 A | 5/1979 | Bauer |
| 4,160,390 A | 7/1979 | Spaetgens |
| 4,194,731 A | 3/1980 | Marx |
| 4,197,931 A | 4/1980 | Norcia |
| 4,221,353 A | 9/1980 | Kuhn et al. |
| 4,307,875 A | 12/1981 | Schnitzius et al. |
| 4,343,404 A | 8/1982 | Folsom |
| 4,400,129 A | 8/1983 | Eisenberg et al. |
| 4,433,759 A | 2/1984 | Ichinose |
| 4,573,854 A | 3/1986 | McFarland |
| 4,595,192 A | 6/1986 | Reist |
| 4,618,140 A | 10/1986 | Brown |
| 4,700,845 A | 10/1987 | Fretter |
| 4,749,089 A | 6/1988 | Stewart, III |
| 4,779,845 A | 10/1988 | Bartesch et al. |
| 4,808,056 A | 2/1989 | Oshima |
| 4,813,550 A | 3/1989 | Saeks |
| 4,852,842 A | 8/1989 | O'Neill |
| 4,854,554 A | 8/1989 | Ludwig |
| 4,901,594 A | 2/1990 | Selzer |
| 5,083,729 A | 1/1992 | Saeks et al. |
| 5,086,930 A | 2/1992 | Saeks |
| 5,125,517 A | 6/1992 | Martinell |
| 5,180,335 A | 1/1993 | Maucher et al. |
| 5,183,162 A | 2/1993 | Ritzenthaler |
| 5,209,628 A * | 5/1993 | Hassell ............... 414/462 |
| 5,257,767 A | 11/1993 | McConnell |
| 5,294,006 A | 3/1994 | Deschino |
| 5,433,376 A | 7/1995 | Kueshner |
| 5,474,189 A | 12/1995 | Peterson |
| 5,529,231 A * | 6/1996 | Burgess ............... 224/502 |
| 5,553,718 A | 9/1996 | Robar |
| 5,638,559 A | 6/1997 | Natri et al. |
| 5,642,820 A | 7/1997 | Angeles |
| 5,662,256 A * | 9/1997 | Bryan ............... 224/523 |
| 5,664,687 A | 9/1997 | Liatti |
| 5,702,091 A | 12/1997 | Perrin et al. |
| 5,709,521 A | 1/1998 | Glass et al. |
| 5,730,345 A * | 3/1998 | Yeckley et al. ............... 224/505 |
| 5,784,740 A | 7/1998 | DiSieno et al. |
| 5,839,719 A | 11/1998 | Hosan et al. |
| 5,845,831 A | 12/1998 | Nushaum et al. |
| 5,860,440 A | 1/1999 | Murray et al. |
| 6,000,071 A | 12/1999 | Fettes |
| 6,082,552 A * | 7/2000 | Pollock et al. ............... 211/18 |
| 6,095,344 A | 8/2000 | White |
| 6,105,795 A | 8/2000 | Terragni |
| 6,163,913 A | 12/2000 | DiSieno et al. |
| 6,199,735 B1 | 3/2001 | Cothern et al. |
| 6,269,658 B1 | 8/2001 | Royal et al. |
| 6,269,958 B1 | 8/2001 | Pollock et al. |
| 6,279,932 B1 | 8/2001 | White et al. |
| 6,302,278 B1 | 10/2001 | Dueck |
| 6,648,148 B1 * | 11/2003 | Bally ............... 211/18 |
| 2007/0007316 A1 * | 1/2007 | Witczak ............... 224/310 |

* cited by examiner

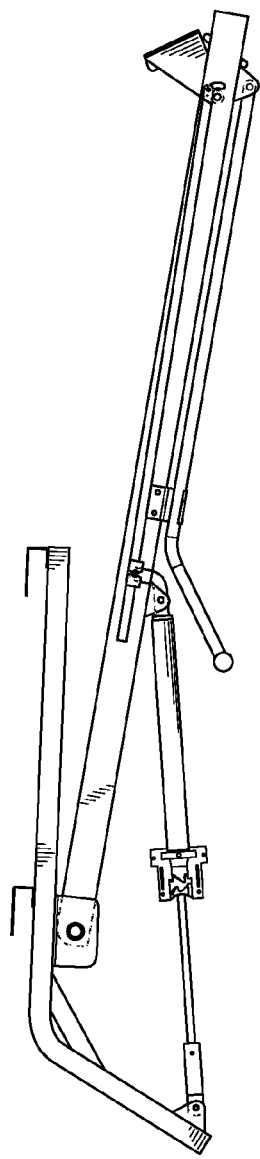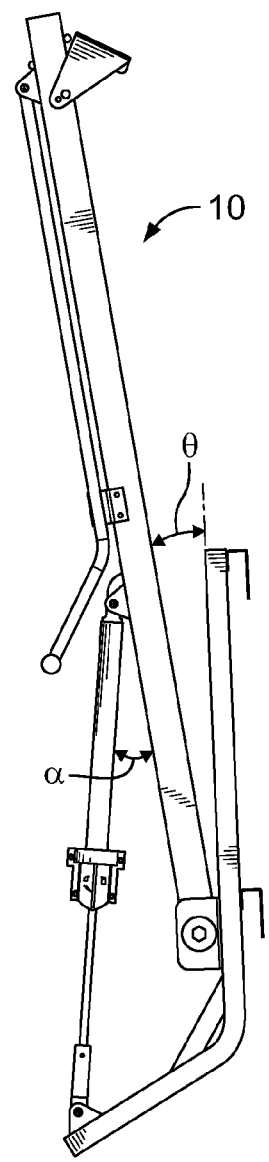
FIG. 2A
FIG. 2B

SELF STORING BICYCLE DISPLAY

BACKGROUND OF THE INVENTION

Bicycle displays are used in all manner of retail sales. It will be recognized that retail display play a large part in making retail items appear attractive and can increase sales. One purpose of such a display is to make it easy to look at (inspect) or otherwise handle the merchandise.

Another purpose of retail displays is to make the overall shopping experience as easy as possible. As such, the merchandise, whether large or small, should be readily visible and should stand out, drawing the shopper's eye.

Many bicycle displays are configured as simple floor stranding racks into which a wheel of the bicycle fits to maintain the bicycle standing. While such a display is effective, it requires floor space (which in the retail environment is at a premium) and does not lend itself to readily inspecting and/or handling the bicycles. In addition, in that many bicycle wheels are of different sizes, the bicycles may not all stand straight or fit properly into the display. In addition, such free-standing displays generally do not make it an easy experience for a shopper to handle and choose a bicycle to fit their needs.

Other bicycle displays are elevated, maintaining the bicycle at or above eye level. Many of these displays simply do not allow a shopper full access to the display to remove the bicycle to take it for a "test ride" around the retail establishment. Still other manners in which bicycles are displayed is to merely leave the bicycle on its stand aligned with other bicycles similarly displayed. While this arrangement provides ready access to the bicycles, a line of such bicycles is not very stable and if one bicycle is knocked over, it could result in a domino effect, knocking over many other bicycles.

Accordingly, there is a need for a bicycle display that can display bicycles at a shopper's eye level. Desirably, such a display is aesthetically pleasing and maintains the bicycles in an orderly, easily accessible manner. More desirably, such a display allows one or more of the bicycles to be closely inspected, and readily removed from and replaced on the display. More desirably still, such a display safely stores and secures the bicycle on the display and allows for ready removal of the storage "locking" measure for removing the bicycle.

BRIEF SUMMARY OF THE INVENTION

A display for a bicycle includes a mount and a support arm pivotally mounted to the mount for movement between a storage position and an access position. The support arm has a hanger or finger extending from an end of the arm for hanging the bicycle.

A cylinder assembly includes a dampening cylinder operably connecting the mount and the support arm to dampen movement of the support arm and to return the support arm to the storage position. The cylinder assembly includes a locking member, preferably formed as a collar, that is configured to lock the cylinder in a retracted position to maintain the support arm in the access position and to release the cylinder to permit the support arm to return to the storage position.

A clamp arm is mounted to the support arm for pivoting between a securing position to secure the bicycle on the hanger when the support arm is in the storage position and a release position to allow for removing the bicycle from the hanger when the support arm is in the access position.

An actuating element is operably connected to the cylinder assembly and to the clamp arm to pivot the clamp arm between the securing position and the release position as the support arm is moved between the storage and access positions.

The present display permits displaying bicycles at a shopper's eye level. The display is aesthetically pleasing and maintains the bicycles in an orderly, easily accessible manner. The display allows one or more of the bicycles to be closely inspected, and readily removed from and replaced on the display. Bicycles are safely stored and secured on the display and are readily released and removed from the storage position for merchandising, inspection and purchase.

In a present display, the cylinder assembly includes a fitting operably connected to the actuating element to pivot the clamp arm. The fitting can be a J-fitting or J-shaped fitting mounted to the cylinder assembly and operably connected to the actuating element by a pin. Preferably, the actuating element and J-fitting are substantially mounted within the support arm.

The locking member can be configured as a locking collar with the cylinder assembly including one or more cooperating locking elements (such as pins) for locking and releasing the cylinder at the collar. To facilitate collar mounting, the cylinder assembly can include a sleeve fitted over the dampening cylinder. The sleeve can include a flange and the collar can include a recess for receiving the flange. The locking collar rotates relative to the flange for locking and releasing the cylinder.

The clamp arm is mounted to the support arm by a pivot. The support arm includes an arcuate slot adjacent to the pivot and the clamp arm includes a pin that extends through the support arm arcuate slot and into the actuating element opening such that reciprocation of the actuating element pivots the clamp arm. The clamp arm maintains the bicycle secured to the support arm when the display is in the storage position and as the display (support arm) is being moved between the storage and display positions.

A pull-down assembly includes a handle for moving the support arm between the storage and access positions. Preferably, the handle is pivotally mounted to the support arm and the support arm includes a clip for securing the handle to the support arm when the handle is not in use.

These and other features and advantages of the present invention will be readily apparent from the following detailed description, in conjunction with the claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIGS. 2A and 2B are side views similar to FIGS. 1A and 1B of the display shown in the storage position;

DETAILED DESCRIPTION OF THE INVENTION

Figures 1A, 1B:
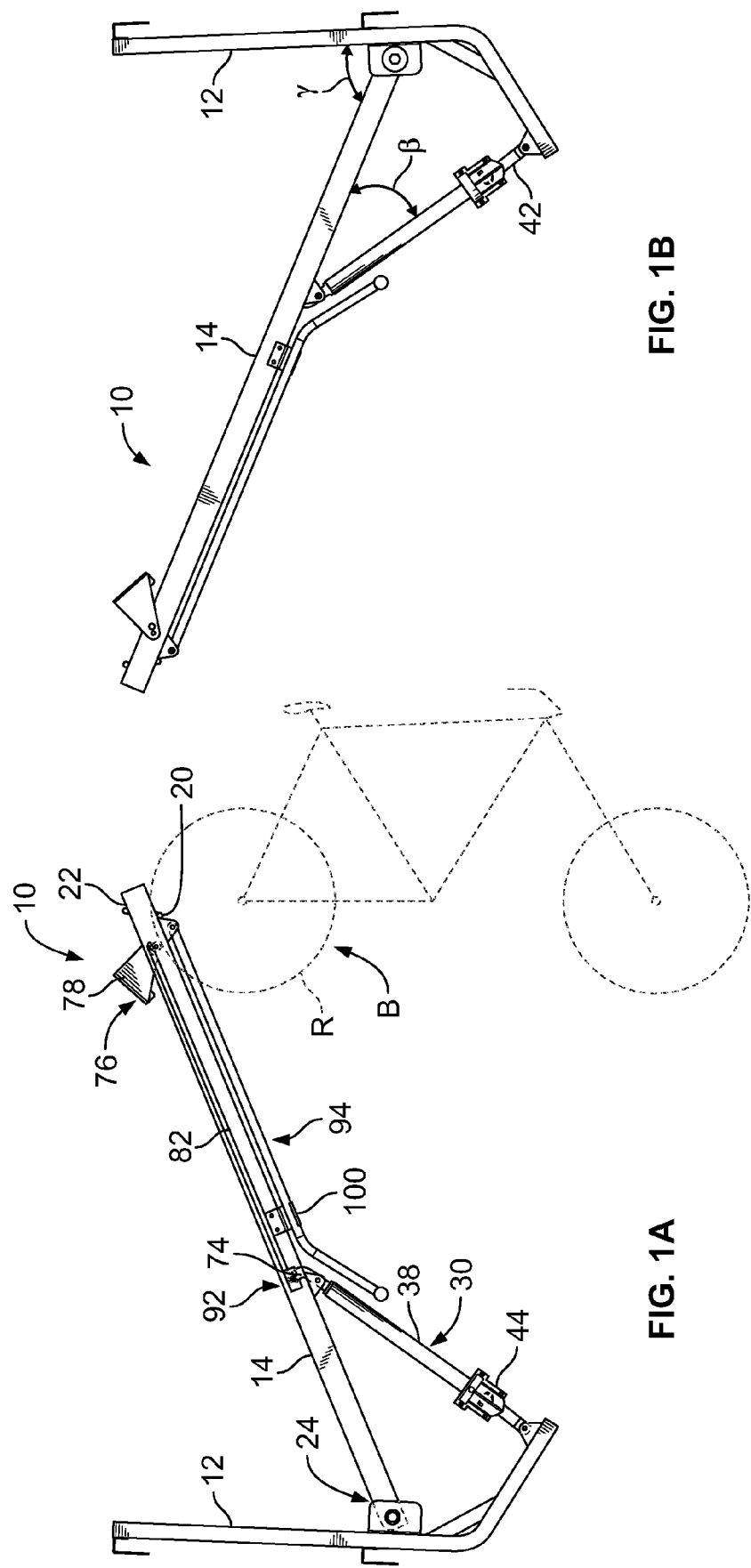
FIGS. 1A and 1B are side views of a self storing bicycle display embodying the principles of the present invention, the display shown in the access position.
Figure 3:
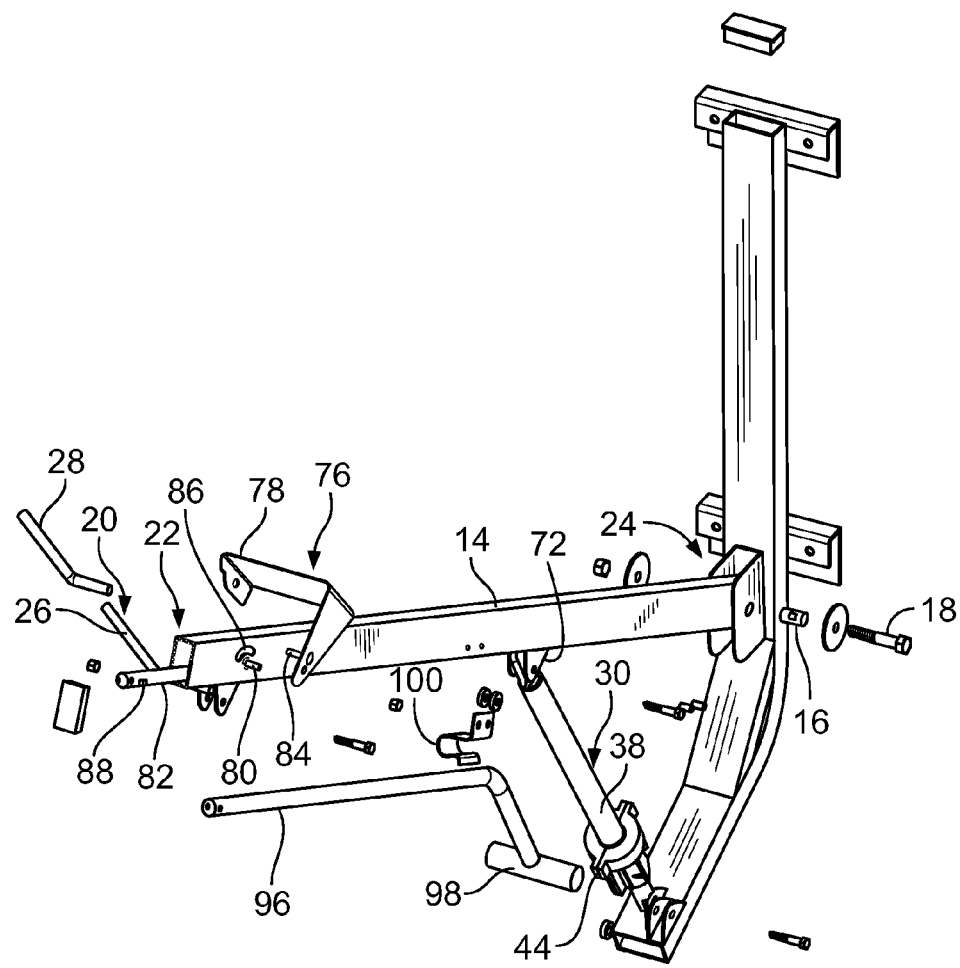
FIG. 3 is a partial exploded view of the display.
Figure 4:
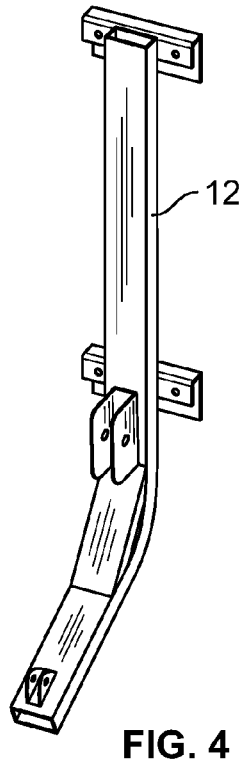
FIG. 4 is a perspective view of the back frame of the display.
Figure 5A:
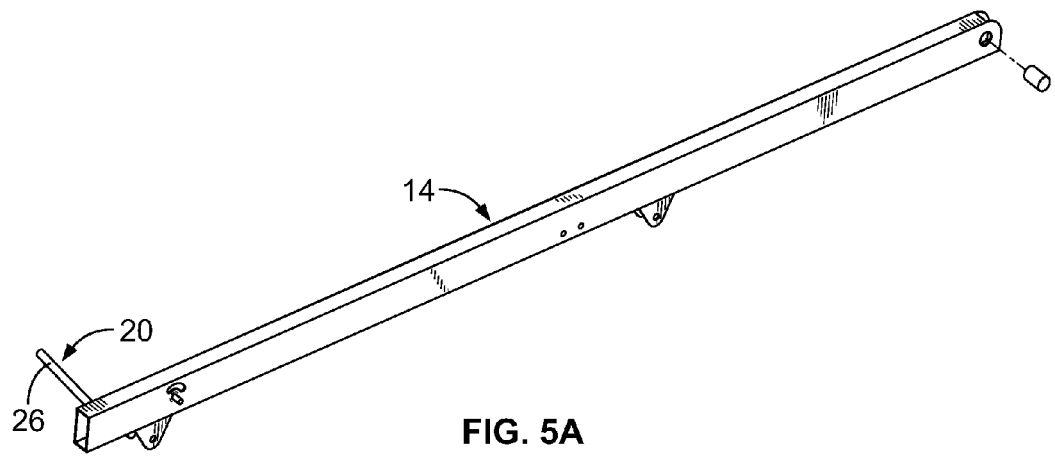
FIGS. 5A-5C are a top perspective view (5A) and side and detail views (5B and 5C) of the support arm.
Figure 5B:
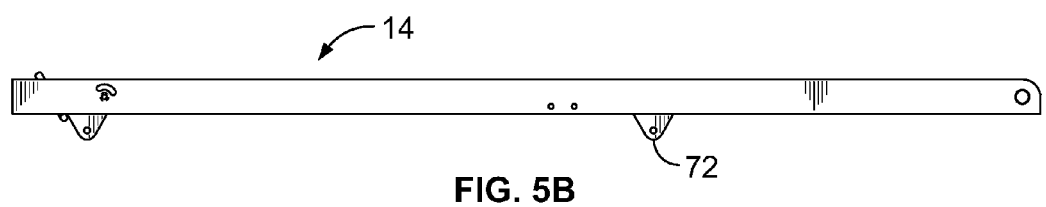
Figure 5C:
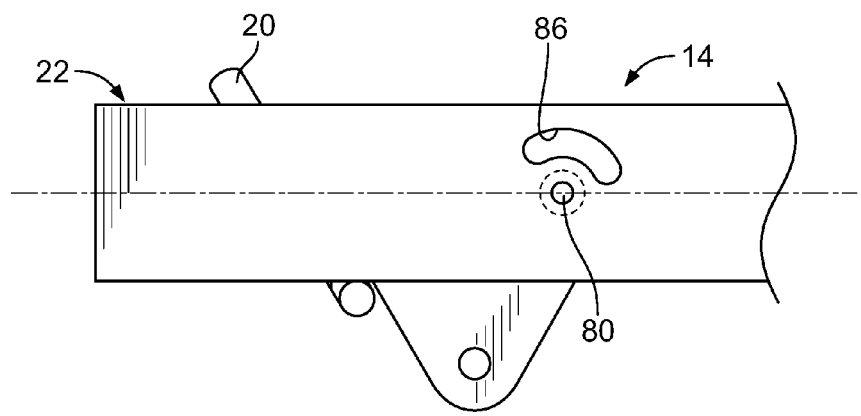
Figure 6A:
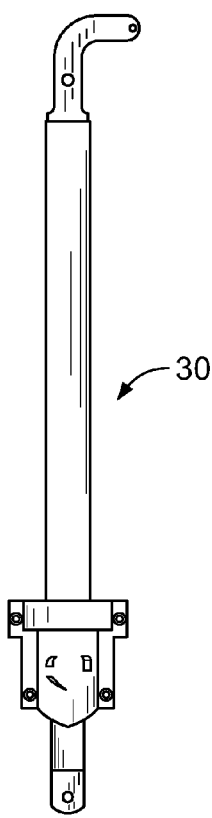
FIGS. 6A-6C are compressed, extended and exploded views of the cylinder assembly.
Figure 6B:
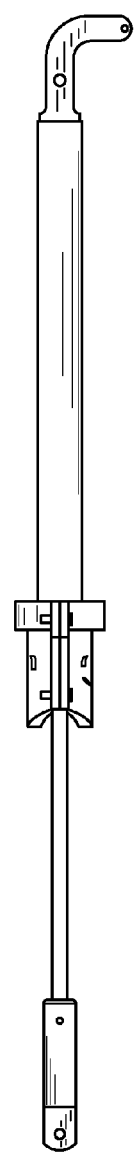
Figure 6C:
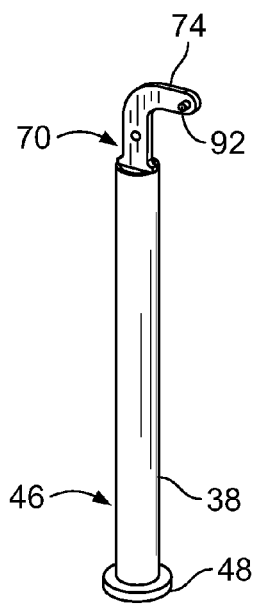
Figure 6C:
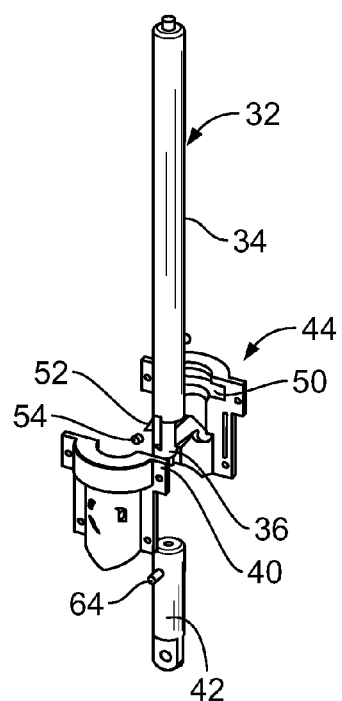
Figure 7A:
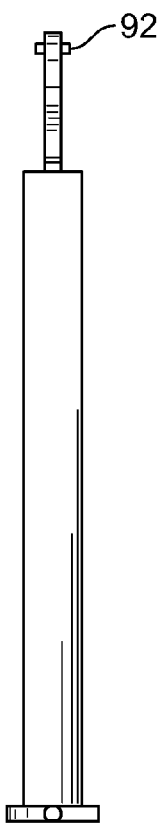
FIGS. 7A-7C are rear, sectional and exploded views of the cylinder assembly shell and clamp arm locking actuator.
Figure 7B:
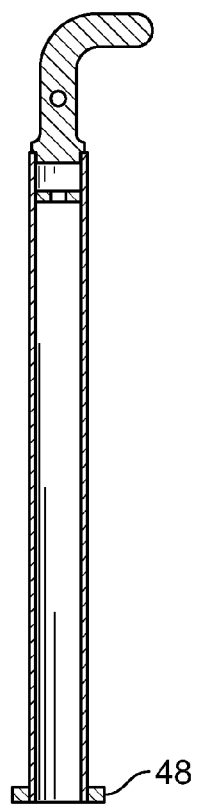
Figure 7C:
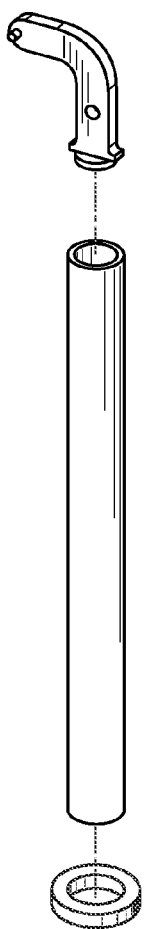
Figure 8A:
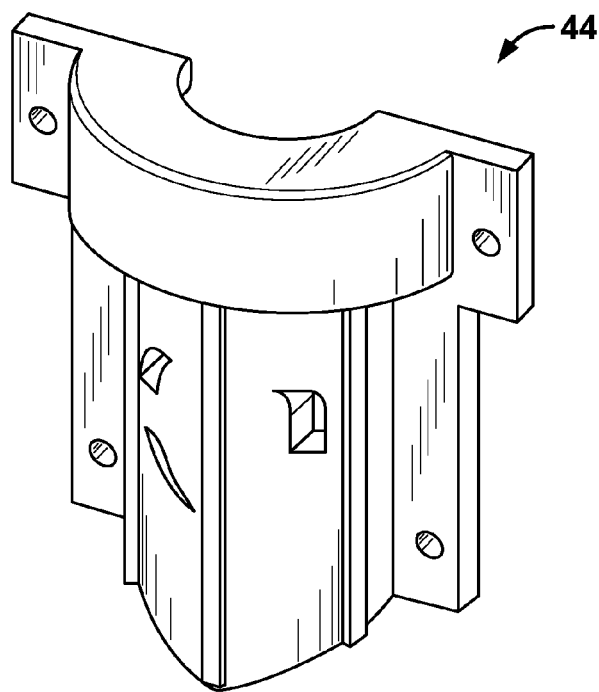
FIGS. 8A-C are perspective and sectional views of the locking collar shell.
Figure 8B:
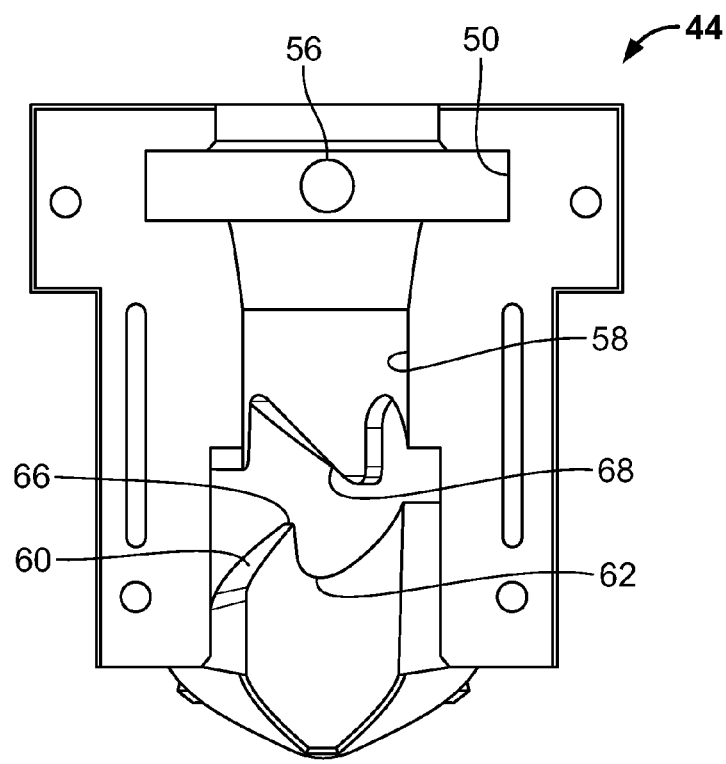
Figure 8C:
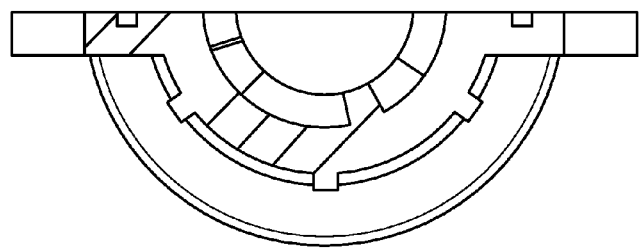
Figure 9:
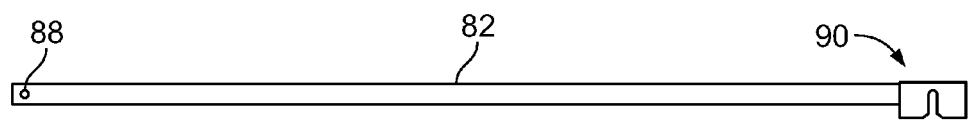
FIG. 9 is a side view of the actuator bar.
Figure 10:
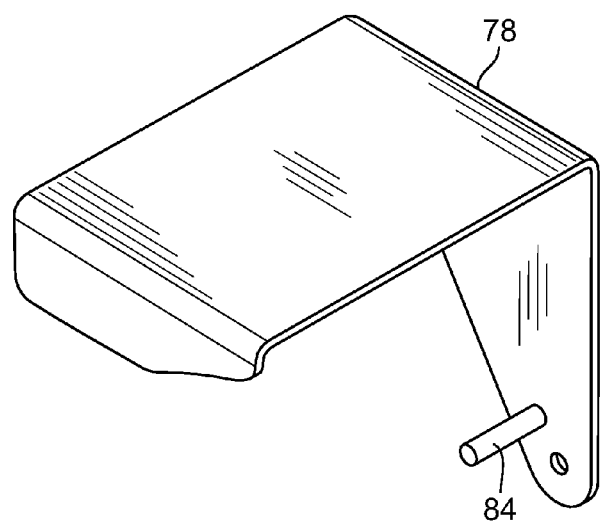
FIG. 10 is a perspective view of the clamp arm.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIGS. 1A-B and 2A-B, there is shown a bicycle display 10 embodying the principles of the present invention. The display 10 is configured to secure a bicycle B in an upper or storage position (see FIGS. 2A-B) and to allow the bike B to be "pulled" down to a lower access position (see FIGS. 1A-B). The display 10 includes a wall mount 12 and a support arm 14 pivotally mounted to the wall mount 12 to pivot up and down. In a present display 10, the arm 14 is pivotally mounted to the mount 12 by a pin 18 and a sheath 16 to prevent wear of the pin 18 (the pivot location). It will be understood that the bicycle display 10 can be mounted to a wall, a fixture, a rack or in any of a wide variety of ways and that all such mounting scenarios are within the scope and spirit of the present invention. In a present display 10, when in the access position the arm 14 is at an angle γ relative to the mount 12 of about 65° and when in the storage position, the arm 14 is at an angle θ relative to the mount 12 of about 7° to about 8°. Other angles are of course contemplated.

A hanger or finger 20 is mounted to the arm 14. The finger 20 is configured for the bicycle B to hang therefrom by, for example, a wheel rim R. The finger 20 is positioned at a far or free end 22 of the arm 14 (spaced from the pivoting end 24). The finger 20 has an upturned portion 26 so that the bicycle B has to be lowered (slightly) onto the finger 20 for hanging from the display 10. In a present embodiment, the finger 20 has a plastic or other non-marring sleeve 28 fitted thereon to prevent marring or abrading the bicycle rim R.

A cylinder assembly 30, which includes a cylinder 32 (preferably a gas/pneumatic cylinder), is mounted to the arm 14 and to the mount 12 (providing a stationary pivot location) to dampen and assist movement of the arm 14 between the upper (storage) and lower (access) positions of the arm 14 and the bike B. The cylinder 32, to assist in moving the arm 14 between the access and storage positions, is slightly pressurized to return the display arm 14 the storage position.

The cylinder assembly 30 includes the gas spring 32 (formed as a piston with a cylinder 34 and a rod 36 that extends and retracts), and a shell 38 that fits over the gas spring 32 and in which the gas spring 32 is mounted. A terminal end 40 of the rod 36 is positioned in a sleeve 42. The sleeve 42 (and rod terminal end 40) is mounted to the mount 12 and the shell 38 is mounted to the support arm 14.

A locking collar 44 is fitted onto an end 46 of the shell 44 (overlying a portion of the rod 36) and is secured to the shell 38 by a flange 48 on the shell 38 that is fitted into a recess 50 in the collar 44. Spring 52 loaded bearings 54 (one shown) are fitted into wells 56 in the recesses 50 to permit smooth movement of the sleeve flange 48 (smooth rotation) in the recesses 50.

The collar 44 includes an inner wall 58 having a pair of opposing ramped channels 60, each with a lower detent 62. Pins 64 in the sleeve 42 ride in the channels 60 and engage the detents 62 such that the cylinder 32 is prevented from extending when the pins 64 are resident in the detents 62. Conversely, the pins 64 exit the collar 44 when the pins 64 pass over peaks 66 in the detents 62 and into the channels 60. It will be appreciated that the action of the cylinder 32 (the gas compressed within the cylinder) serves to extend the piston 32 (rod 36) relative to the cylinder 34. As such, the gas pressure maintains the pins 64 in the detents 62 when the pins 64 are locked into the detents 62.

The display 10 is configured so that the cylinder 32 maintains the support arm 14 in the storage position. The locking collar 44 is configured to restrain the cylinder 32 when the pins 64 are engaged with the detents 62 (to maintain the display 10 in the access position). By pulling down on the support arm 14, which further compresses the cylinder, the pins 64 are urged upward in the collar 44. The collar inner wall channels 60 include upper ramps 68 as well. In this manner, as the support arm 14 is urged 9 pulled) down, the pins 64 engage the upper ramps 68 to rotate the collar 44 relative to the pins 64. It will be appreciated that since the pins 64 are rotationally fixed, the collar 44 rotates. This rotation aligns the pins 64 with the channels 60 to release the cylinder portion 34 and to permit the rod portion 36 to extend relative to the cylinder portion 34.

The opposing end 70 of the shell 38 is mounted to the arm 14 at about an intermediate location along the arm 14. The arm 14 includes a pivot 72 to which the shell 38 is mounted. The shell 38 includes a clamp arm locking fitting or J-actuator (or J-fitting) 74 that is positioned, at least in part, within the arm 14 when the shell 38 is mounted to the arm 14.

A locking assembly 76 is mounted to the arm 14 and the J-fitting 74 to lock the bicycle B to the arm 14. The locking assembly 76 includes a clamp arm 78 that is pivotally mounted to the end 22 of the support arm 14 by a pivot pin 80 extending from the arm 14, at about the finger 20. An actuating bar 82 that is mounted to the clamp arm 78 and the J-fitting 74 is preferably located internal of the arm 14.

The clamp arm 78 includes an actuating pin 84 (adjacent to the pivot 80) that extends into an arcuate channel 86 in the support arm 14 and into an opening 88 in the actuating bar 82. In this manner as the actuating bar 82 is moved relative to the arm 14 (the actuating bar 82 generally reciprocates, forward and rearward within the arm 14), the clamp arm 78 is pivoted between the storage and access positions (as seen in FIGS. 1 and 2). Advantageously, safety is enhanced in that the clamp arm 78 maintains the bicycle B secured to the support arm 14 when the display 10 is in the storage position and as the display 10 (support arm 14) is being moved between the storage and display positions.

As set forth above, the rear end 90 of the actuating bar 82 is mounted to the J-fitting 74 by stubs or pins 92. As such, when the arm 14 is up in the storage position, the cylinder assembly 30 is at a more acute angle α relative to the arm 14 and the J portion of the J-fitting 74 is urged forward, toward the clamp arm 78. In this position the actuating bar 82 is likewise urged forward, toward the clamp arm 78 and the clamp arm 78 is pivoted forward to clamp the bicycle tire rim R between the finger 20 and the clamp arm 78.

As the arm 14 is pulled down to the access position, the angle β between the cylinder 30 and the arm 14 is increased (less acute) which urges the actuating bar 82 rearward, toward the mount 12. This likewise pulls the pivot pin 80 on the clamp arm 78 which pivots the clamp arm 78 rearward away from the finger 20. This releases the bicycle tire rim R from the finger 20 and the bicycle B can readily be lifted from the display 10 (from the finger 20).

To facilitate moving the display 10, that is, the arm 14 and bicycle B between the storage and access positions, a pull-down assembly 94 includes a pull-down arm 96 that is mounted to the support arm 14 at about the end 22 of the arm 14. The pull-down arm 96 has a handle 98 to grasp to pull down arm 14 (move the display 10) to the access position. The pull-down arm 96 is also used to guide or urge the arm 14 up to the storage position. A clip mounted 100 to the support arm 14 permits storing the pull-down arm 96 when it is not in use.

Advantageously, the present display 10 permits securely supporting a bicycle B from a wall mount 12, in which the bicycle is "clamped" to the display 10 when in the storage position and the bicycle is free to be removed from the display 10 (although supported therefrom) when in the access position. That is, clamp arm 78 maintains the bicycle B secured to the support arm 14 when the display 10 is in the storage position and as the display 10 (the support arm 14) is moved between the storage and display positions.

Moreover, the present display 10 uses a gas cylinder 32 to assist moving the display 10 between the storage and access positions, with or without the bicycle B suspended therefrom. A further advantage still is that the present display 10 includes a novel locking collar 44 to retain the display 10 (and the bicycle B) in the access position, even against the bias of the cylinder 32 and regardless of whether there is insufficient counterbalance weight, that, with a slight pull against the bias of cylinder 32, releases the display 10 to return to the storage position.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the claims.

What is claimed is:

1. A display for a bicycle, comprising:
   a mount;
   a support arm pivotally mounted to the mount for movement between a storage position and an access position, the support arm having a hanger thereon for hanging the bicycle therefrom;
   a cylinder assembly including a dampening cylinder operably connecting the mount and the support arm to dampen movement of the support arm and to return the support arm to the storage position, the cylinder assembly including a locking member configured to lock the cylinder in a retracted position to maintain the support arm in the access position and to release the cylinder to permit the support arm to return to the storage position, wherein the locking member is a locking collar and wherein the cylinder assembly includes one or more cooperating locking elements for locking and releasing the cylinder;
   a clamp arm mounted to the support arm for pivoting between a securing position when the support arm is in the storage position and a release position when the support arm is in the access position;
   an actuating element operably connected to the cylinder assembly and to the clamp arm to pivot the clamp arm between the securing position and the release position;
   wherein the cylinder assembly includes a fitting operably connected to the actuating element to pivot the clamp arm and wherein the actuating element and the fitting are substantially mounted within the support arm.

2. The display in accordance with claim 1 wherein the fitting is a J-fitting mounted to the cylinder assembly and operably connected to the actuating element by a pin.

3. The display in accordance with claim 1 wherein the cylinder assembly includes a sleeve fitted over the dampening cylinder, the sleeve having a flange, and wherein locking collar includes a recess for receiving the flange, the locking collar rotating relative to the flange for locking and releasing the cylinder.

4. The display in accordance with claim 1 wherein a bearing is disposed to permit rotation of the collar relative to the sleeve flange.

5. The display in accordance with claim 1 wherein the clamp arm is mounted to the support arm by a pivot and wherein the support arm includes an arcuate slot therein adjacent the pivot, and wherein the actuating element and clamp arm include a pin and opening for movement of the pin through the support arm arcuate slot to pivot the clamp arm.

6. The display in accordance with claim 5 wherein the pin is disposed on the clamp arm extending through the support arm arcuate slot and into the actuating element opening.

7. The display in accordance with claim 1 including a pull-down assembly including a handle for moving the support arm between the storage and access positions.

8. The display in accordance with claim 7 wherein the pull-down assembly handle is pivotally mounted to the support arm and including a clip for securing the handle to the support arm when it is not in use.

9. A display for a bicycle, comprising:
   a mount;
   a support arm pivotally mounted to the mount for movement between a storage position and an access position, the support arm having a hanger extending therefrom for hanging the bicycle thereon;
   a dampening cylinder operably connected to the mount and to the support arm and reciprocal between an extended condition when the support arm is in the storage position and a retracted position when the support arm is in the access position, the dampening cylinder configured to dampen movement of the support arm and to return the support arm to the storage position, the dampening cylinder lockable in the retracted position;
   a clamp arm mounted to the support arm for pivoting between a securing position when the support arm is in the storage position and a release position when the support arm is in the access position;
   an actuating element operably connected to the cylinder assembly and to the clamp arm to pivot the clamp arm between the securing position and the release position;
   wherein the dampening cylinder includes a fitting operably connected to the actuating element to pivot the clamp arm and the actuating element is substantially mounted within the support arm;
   a locking member operably mounted to the dampening cylinder for locking the dampening cylinder in the retracted position;

wherein the dampening cylinder includes a cylinder and rod and wherein the locking member includes a collar mounted to the cylinder for rotation about the cylinder and for reciprocating movement with the cylinder, the collar lockable to the rod.

10. The display in accordance with claim 9 wherein the fitting is configured to reciprocate the actuating element as the support arm is pivoted between the storage and access positions.

11. The display in accordance with claim 9 wherein the clamp arm is mounted to the support arm by a pivot and wherein the support arm includes an arcuate slot therein adjacent the pivot, and wherein the actuating element and clamp arm include a pin and opening for movement of the pin through the support arm arcuate slot to pivot the clamp arm.

12. The display in accordance with claim 11 wherein the pin is disposed on the clamp arm extending through the support arm arcuate slot and into the actuating element opening.

13. The display in accordance with claim 9 including a pull-down assembly including a handle for moving the support arm between the storage and access positions, the handle being secured to the support arm when the handle is not in use.

* * * * *